US008792856B2

(12) United States Patent
Velusamy et al.

(10) Patent No.: US 8,792,856 B2
(45) Date of Patent: Jul. 29, 2014

(54) MULTI-TIERED, USAGE-BASED PRICING SERVICE PLAN

(75) Inventors: Umashankar Velusamy, Tampa, FL (US); Bhaskar R. Gudlavenkatasiva, Tampa, FL (US); George L. Hughes, Jr., Wesley Chapel, FL (US); Nityanand Sharma, Tampa, FL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 89 days.

(21) Appl. No.: 13/537,117

(22) Filed: Jun. 29, 2012

(65) Prior Publication Data
US 2012/0329425 A1 Dec. 27, 2012

Related U.S. Application Data

(63) Continuation-in-part of application No. 13/169,198, filed on Jun. 27, 2011, now Pat. No. 8,521,129.

(51) Int. Cl.
*H04M 11/00* (2006.01)
(52) U.S. Cl.
USPC ............ 455/406; 455/405; 455/407; 455/408
(58) Field of Classification Search
CPC ....................................................... H04W 4/26
USPC .................................. 455/406, 405, 407, 408
See application file for complete search history.

(56) References Cited

U.S. PATENT DOCUMENTS

| 6,532,366 | B1 | 3/2003 | Chung et al. |
| 7,068,996 | B1* | 6/2006 | Pryor ............................ 455/406 |
| 7,986,935 | B1 | 7/2011 | D'Souza et al. |
| 2005/0044018 | A1* | 2/2005 | Whewell ......................... 705/34 |
| 2005/0105467 | A1 | 5/2005 | True et al. |
| 2006/0063510 | A1 | 3/2006 | Wills et al. |
| 2006/0111079 | A1 | 5/2006 | Tischer et al. |
| 2008/0014904 | A1 | 1/2008 | Crimi et al. |
| 2008/0119163 | A1 | 5/2008 | Marsh et al. |
| 2010/0093309 | A1* | 4/2010 | Clayton ........................ 455/407 |
| 2010/0144310 | A1 | 6/2010 | Bedingfield et al. |
| 2012/0142301 | A1 | 6/2012 | Pugh et al. |

* cited by examiner

Primary Examiner — Barry Taylor

(57) ABSTRACT

A non-transitory computer-readable medium comprising instructions executable by at least one processor, the instructions to cause the at least one processor to bill a subscriber, enrolled in a multi-tiered pricing plan, a plan fee associated with the multi-tiered pricing plan, for each billing cycle of a plurality of billing cycles, for services associated with a subscriber device; track, for each billing cycle, an amount of usage of the services; determine, for each billing cycle, a pricing tier corresponding to the tracked usage; and bill the subscriber, for each billing cycle, a fee associated with the corresponding pricing tier, wherein at least two of the corresponding pricing tiers differ.

18 Claims, 6 Drawing Sheets

US 8,792,856 B2

MULTI-TIERED, USAGE-BASED PRICING SERVICE PLAN

RELATED APPLICATION

The present application is a continuation-in-part (CIP) of U.S. patent application Ser. No. 13/169,198, filed Jun. 27, 2011, and entitled, Adaptive Pricing Service Plan, the disclosure of which is hereby incorporated herein by reference.

BACKGROUND

Content providers typically offer media content and service providers typically offer communication services, to a subscriber, subject to the terms of a pricing plan in effect at the start of a billing cycle (e.g., one month). For voice plans, for example, minute-based plans may include a set range of "minutes"—that a subscriber is allotted—at a fixed fee. For usage exceeding the allotted number of minutes, a per-minute or other unit charge may be assessed for the excess minutes used in the billing cycle, and compensation may not be made for under-usage.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

The term "network," as used herein, is intended to be broadly interpreted to include a wireless network (e.g., mobile network, cellular network, non-cellular network, etc.) and/or a wired network. In this regard, the embodiments described herein may be implemented within a variety of network types, such as, for example, a Global System for Mobile Communications (GSM) network, a Universal Mobile Telecommunication System (UMTS) network, a Wideband Code Division Multiple Access (WCDMA) network, an Ultra Mobile Broadband (UMB) network, a High-Speed Packet Access (HSPA) network, a Worldwide Interoperability for Microwave Access (WiMAX) network, an Institute of Electrical and Electronics Engineers (IEEE) 802.X network, an Evolution Data Optimized (EV-DO) network, a Long Term Evolution (LTE) network, an evolved High Rate Packet Data (eHRPD) network, and/or another type of wireless network (e.g., an ad hoc network, etc.), or some other type of wired network.

Figure 1:
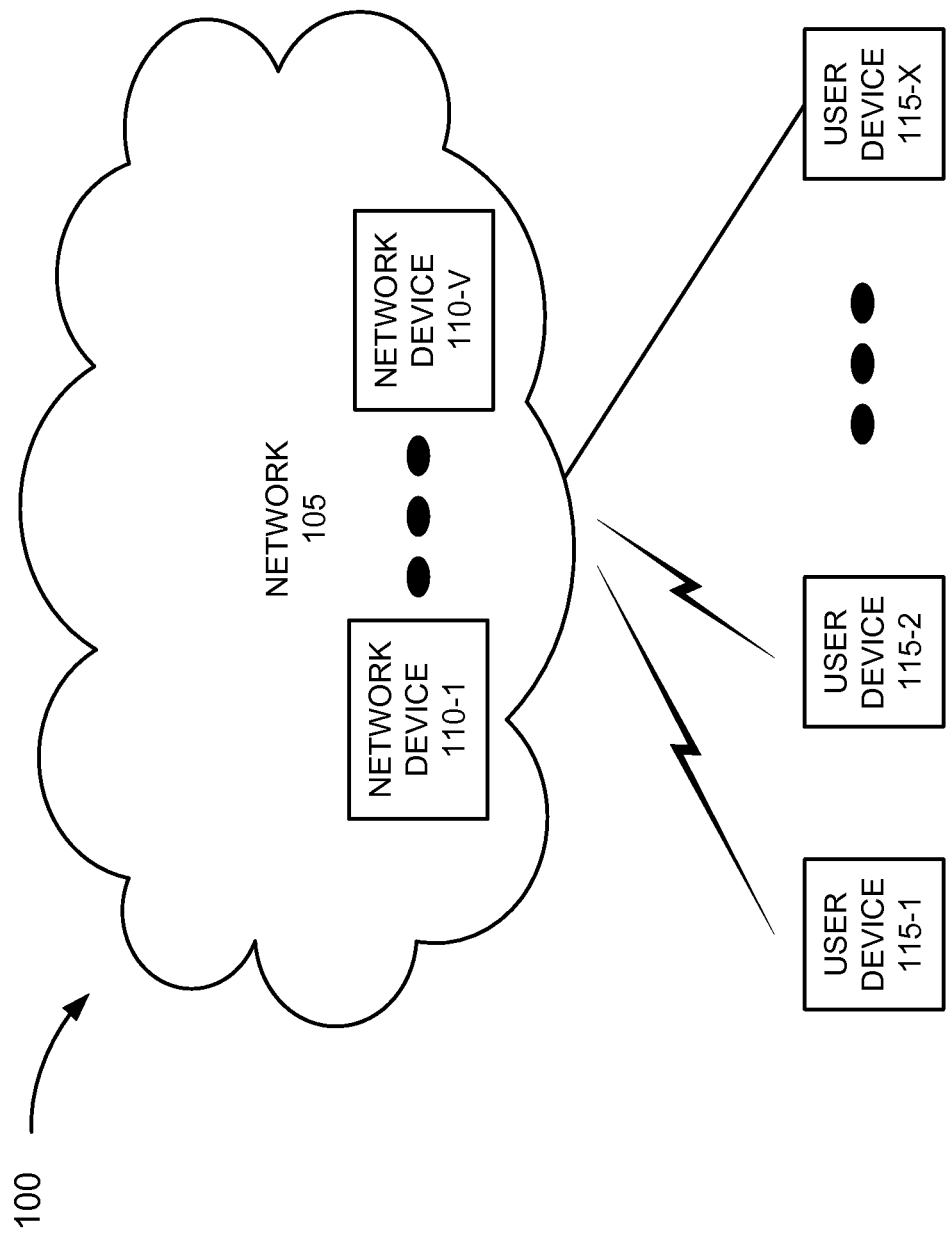
FIG. 1 is a diagram illustrating an exemplary environment in which providing recommendations based on cumulative usage information may be implemented.

FIG. 1 is a diagram illustrating an exemplary environment 100 in which various embodiments described herein may be implemented. As illustrated, exemplary environment 100 may include a network 105 including network devices 110-1 through 110-V (referred to collectively as network devices 110 or individually as network device 110), and user devices 115-1 through 115-X (referred to collectively as user devices 115 or individually as user device 115).

Network 105 may include one or multiple networks of one or multiple types. Network 105 may provide access to various content, applications, and/or services to subscribers or customers. Network devices 110 may include one or multiple network devices that provide multi-tier pricing service plans to customers based on application and/or service usage information, as described herein. In one embodiment, network device(s) 110 may include a network service provider configured to provide digital media content and/or communication services to, for example, subscriber devices.

Communication services may include voice communications (e.g., VoIP), short message service (SMS) communications, and/or multimedia messaging service (MMS) communications, or any other type of voice and/or text-based communications. Other types of communication services may include downloading and/or uploading of content (e.g., videos, etc.) from a web site on a network, downloading and/or uploading audio files (e.g., music), or downloading and/or uploading other types of data, for example, for use in a cell phone.

User device 115 may include a device configured to communicate with other devices, systems, networks, and/or the like. In practice, user device 115 may correspond to a stationary device, a portable device, a handheld device, a mobile device, a vehicle-based device, or some other type of user device. As an example, user device 115 may correspond to a wireless telephone, a computer (e.g., a desktop, a laptop, a palmtop, a netbook, a tablet, etc.), a personal digital assistant (PDA), a personal communication system (PCS) terminal, a gaming console, a music playing device, a video playing device, a location-aware device, and/or a television. User device 115 may operate according to one or multiple communication standards, protocols, etc. User device 115 may communicate via a wireless connection and/or via a wired connection.

According to exemplary embodiments, network devices 110 may perform tracking of cumulative usage (e.g., of minutes) of applications and/or services by subscriber devices (e.g., user devices 115). Based on the tracked cumulative usage information, network devices 110 may generate service-related and/or pricing plan-related billing information and/or in-cycle usage information for subscribers. Network devices 110 may provide the billing information, in-cycle usage information, and/or recommendation information to the subscribers via the respective subscriber devices and/or via another device(s) associated with the subscribers.

The billing information, in-cycle usage data, and/or recommendations information may pertain to a television service, an Internet service, a mobile service, a telephone service, and/or an application used by the subscribers provided by the service provider. As an example, the recommendations may include a recommendation of a service plan, a particular product, a service or an application control option, cumulative usage information, and/or other status information pertaining to the subscribers' service usage. According to an exemplary embodiment, network devices 110 may use access point names (APN) to organize applications and/or services for tracking cumulative usage and generating cumulative usage information. For example, applications and/or services may track cumulative usage in terms of amount of data (e.g., number of bits, number of bytes, etc.), duration (e.g., number of minutes, etc.), transactions (e.g., number of messages (e.g., Short Messaging Service (SMS) messages, Multimedia Messaging Service (MMS) messages, etc.), number of downloads and/or uploads (e.g., music, pictures, video, etc.)), and/or other types of tracking that may be attributed to a particular application and/or service.

According to other embodiments, network devices 110 may use other types of tracking, such as, for example, protocol used (e.g., Session Initiation Protocol (SIP), etc.), system used (e.g., Internet Protocol Multimedia Subsystem (IMS), etc.), other attributes pertaining to the application and/or the service, other attributes pertaining to a service plan associated with the application and/or the service, etc., to organize the tracking of cumulative usage pertaining to applications and/or services and generating cumulative usage information. According to an exemplary embodiment, the type of tracking may be based on network tracking policies.

Figure 2:
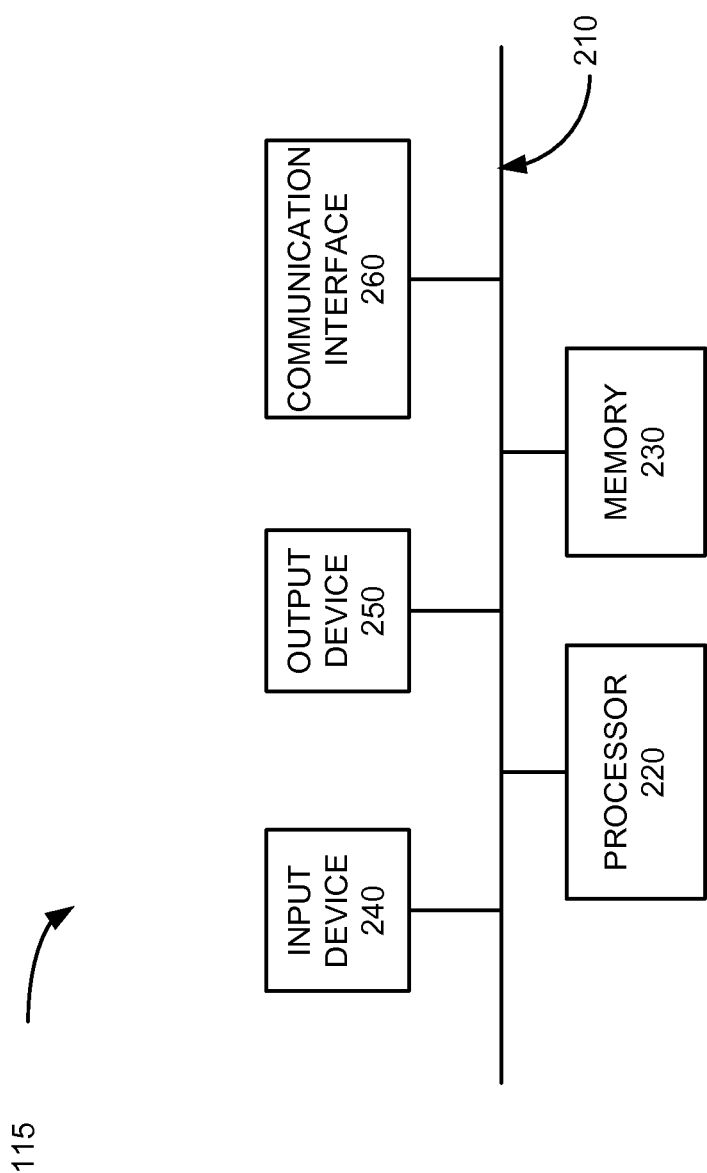
FIG. 2 illustrates an exemplary configuration of components implemented in one or more of the devices of FIG. 1.

FIG. 2 illustrates an exemplary configuration of user device 115 (and/or network device 110). Referring to FIG. 2, user device 115 may include bus 210, processor 220, memory 230, input device 240, output device 250 and communication interface 260. Bus 210 may include a path that permits communication among the elements of network device 110 and/or user device 115.

Processor 220 may include one or more processors, microprocessors, or processing logic that may interpret and execute instructions. Memory 230 may include a random access memory (RAM) or another type of dynamic storage device that may store information and instructions for execution by processor 220. Memory 230 may also include a read only memory (ROM) device or another type of static storage device that may store static information and instructions for use by processor 220. Memory 230 may further include a solid state drive (SDD). Memory 230 may also include a magnetic and/or optical recording medium (e.g., a hard disk) and its corresponding drive.

Input device 240 may include a mechanism that permits a user to input information to user device 115, such as a keyboard, a keypad, a mouse, a pen, a microphone, a touch screen, voice recognition and/or biometric mechanisms, etc. Output device 250 may include a mechanism that outputs information to the user, including a display (e.g., a liquid crystal display (LCD)), a printer, a speaker, etc. In some implementations, a touch screen display may act as both an input device and an output device.

Communication interface 260 may include one or more transceivers that user device 115 uses to communicate with other devices via wired, wireless or optical mechanisms. For example, communication interface 260 may include one or more radio frequency (RF) transmitters, receivers and/or transceivers and one or more antennas for transmitting and receiving RF data via network 105. Communication interface 260 may also include a modem or an Ethernet interface to a LAN or other mechanisms for communicating with elements in a network, such as network 105 or another network.

The exemplary configuration illustrated in FIG. 2 is provided for simplicity. It should be understood that user device 115 may include more or fewer devices than illustrated in FIG. 2. In an exemplary implementation, user device 115 may perform operations in response to processor 220 executing sequences of instructions contained in a computer-readable medium, such as memory 230. A computer-readable medium may be defined as a physical or logical memory device. The software instructions may be read into memory 230 from another computer-readable medium (e.g., a hard disk drive (HDD), SSD, etc.), or from another device via communication interface 260. Alternatively, hard-wired circuitry may be used in place of or in combination with software instructions to implement processes consistent with the implementations described herein. Thus, implementations described herein are not limited to any specific combination of hardware circuitry and software.

Figure 3:
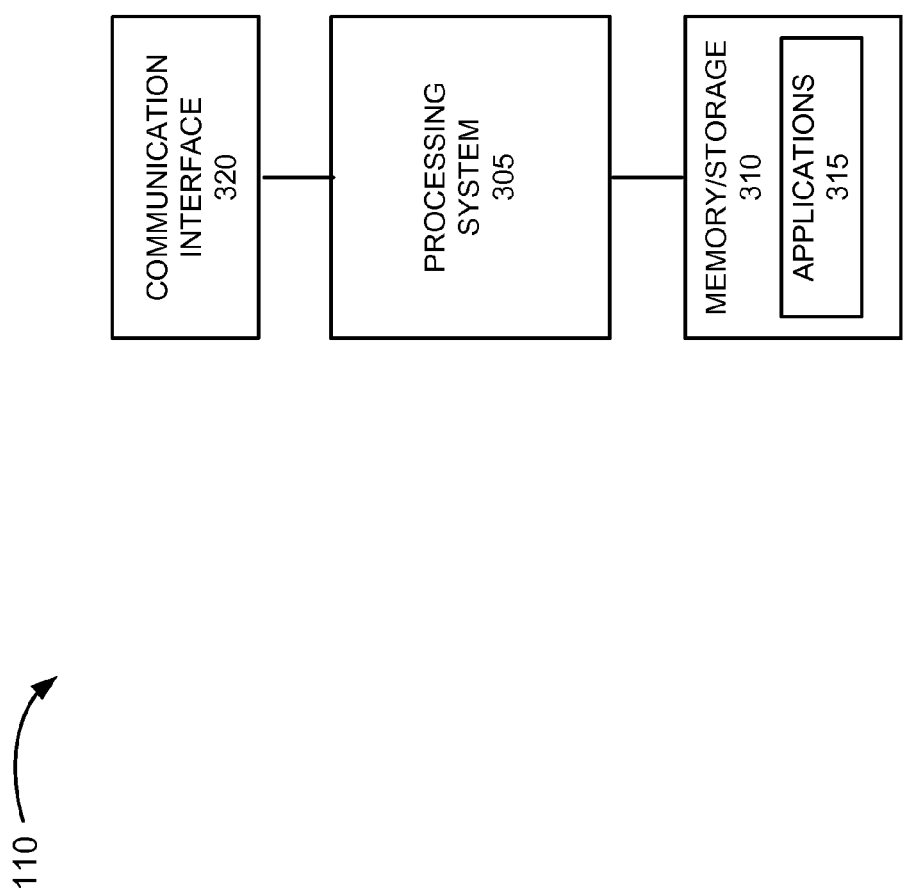
FIG. 3 is a diagram illustrating exemplary functional components of a device that may correspond to one or more of the devices depicted in FIG. 2.

FIG. 3 is a diagram illustrating exemplary functional components of network device 110 (and/or user device 115) that may correspond to one or more of the devices in environment 100. As illustrated, device 300 may include a processing system 305, memory/storage 310 including applications 315, and a communication interface 320. According to other embodiments, network device 110 may include fewer components, additional components, different components, and/or a different arrangement of components than those illustrated in FIG. 3 and described herein.

Processing system 305 may include one or multiple processors, microprocessors, data processors, co-processors, application specific integrated circuits (ASICs), controllers, programmable logic devices, chipsets, field programmable gate arrays (FPGAs), or some other component that may interpret and/or execute instructions and/or data. Processing system 305 may control the overall operation, or a portion of operation(s) performed by network device 110. Processing system 305 may perform one or multiple operations based on an operating system and/or various applications (e.g., applications 315). Processing system 305 may access instructions from memory/storage 310, from other components of network device 110, and/or from a source external to network device 110 (e.g., another device, a network, etc.).

Memory/storage 310 may include one or multiple memories and/or one or multiple secondary storages. For example, memory/storage 310 may include a random access memory (RAM), a dynamic random access memory (DRAM), a read only memory (ROM), a programmable read only memory (PROM), a flash memory, and/or some other type of non-transitory storing medium (e.g., a computer-readable medium, a compact disk (CD), a digital versatile disk (DVD), or the like). Memory/storage 310 may include a hard disk (e.g., a magnetic disk, an optical disk, a magneto-optic disk, a solid state disk, etc.) or some other type non-transitory medium, along with a corresponding drive. Memory/storage 310 may be external to and/or removable from network device 110, such as, for example, a Universal Serial Bus (USB) memory stick, a dongle, a hard disk, mass storage, off-line storage, or the like.

The term "computer-readable medium," as used herein, is intended to be broadly interpreted to include, for example, a memory, a secondary storage, a CD, a DVD, or another type of tangible storage medium. Memory/storage 310 may store data, application(s), and/or instructions related to the operation of network device 110.

Applications 315 may include software that provides various services or functions. For example, applications 315 may include applications that perform various network-related and/or communication related functions. According to an exemplary embodiment, applications 315 may include one or multiple applications to implement the providing of recommendations based on service usage information, as described herein. In one embodiment, applications 315 may include a plurality of forecasting models, including algorithms of varying complexity, providing multi-levels of comprehensiveness or sophistication associated with the respective forecasting models. In one embodiment, the level of comprehensiveness may be a default and/or may be selectable, for example, by the subscriber. For example, a lowest level of complexity may include determining an average cumulative usage during a billing cycle.

Communication interface 320 may permit network device 110 to communicate with other devices, networks, systems and/or the like. Communication interface 320 may include one or multiple wireless interfaces and/or wired interfaces. Communication interface 320 may include one or multiple transmitters, receivers, and/or transceivers. Depending on the network, communication interface 320 may include interfaces according to one or multiple communication standards.

Network device 110 may perform operations in response to processing system 305 executing software instructions stored memory/storage 310. For example, the software instructions may be read into memory/storage 310 from another memory/storage 310 or from another device via communication interface 320. The software instructions stored in memory/storage 310 may cause processing system 305 to perform processes described herein. Alternatively, according to another implementation, network device 110 may perform processes based on the execution of hardware (e.g., processing system 305, etc.), the execution of hardware and firmware, or the execution of hardware, software (e.g., applications 315), and firmware.

As previously described, according to exemplary embodiments, network device(s) 110 may provide tracking of cumulative usage of applications and/or services by user devices. Based on the cumulative usage information, network device(s) 110 may generate service notifications and/or product-related recommendations and provide the recommendations to customers associated with the user devices.

Table 1 below illustrates a number of exemplary multi-tiered, usage-based service plans that may be included in a pricing schedule established by a service provider. As shown in Table 1, plans may differ with respect to, for example, the number of usage/pricing tiers per plan, allocated usage (e.g., minutes) per pricing tier, usage fees, fee rate differences per usage tier, and plan fees. Various other differences among the plans are possible. In one embodiment, the range of minutes per tier may vary within a plan. Plan C, for example, shows a range of about 200 minutes for first and second tiers, and a range of unlimited minutes for a third tier, while Plan D shows a range of about 100 minutes and 200 minutes for first and second tiers, respectively, and a range of unlimited minutes for a third tier.

Various other non-uniform ranges are possible, including one or more tiers having uniform ranges. In one embodiment, the respective fixed plan fees may have an inverse relationship with the corresponding varying usage fees. In some embodiments, the Plan Fee is billed irrespective of the number of minutes used during the billing cycle. That is, the Plan Fee is a fixed fee. Other tier/pricing schedules than that shown in Table 1 may be established.

TABLE 1

| PLAN | MIN | USAGEFEE($)/CYCLE | PLANFEE($)/CYCLE |
|---|---|---|---|
| A | 0-200 | 30 | 0 |
|   | 201-400 | 50 |   |
|   | >400 | 60 |   |
| B | 0-200 | 15 | 10 |
|   | 201-400 | 35 |   |
|   | >400 | 50 |   |
| C | 0-200 | 5 | 15 |
|   | 201-400 | 20 |   |
|   | >400 | 35 |   |
| D | 0-100 | 5 | 15 |
|   | 101-300 | 15 |   |
|   | >300 | 35 |   |
| ... | ... | ... | ... |
| N | 0-P | V | Z |
|   | Q-R | W |   |
|   | S-T | X |   |
|   | >U | Y |   |

For monthly usage totaling 300 minutes, for example, network device 110 may bill a subscriber enrolled in Plan A total of $50 in fees, a subscriber enrolled in Plan B a total of $45 in fees, a subscriber enrolled in Plan C a total of $35 in fees, and a subscriber enrolled in Plan D a total of $30 in fees, and so forth.

Figure 4:
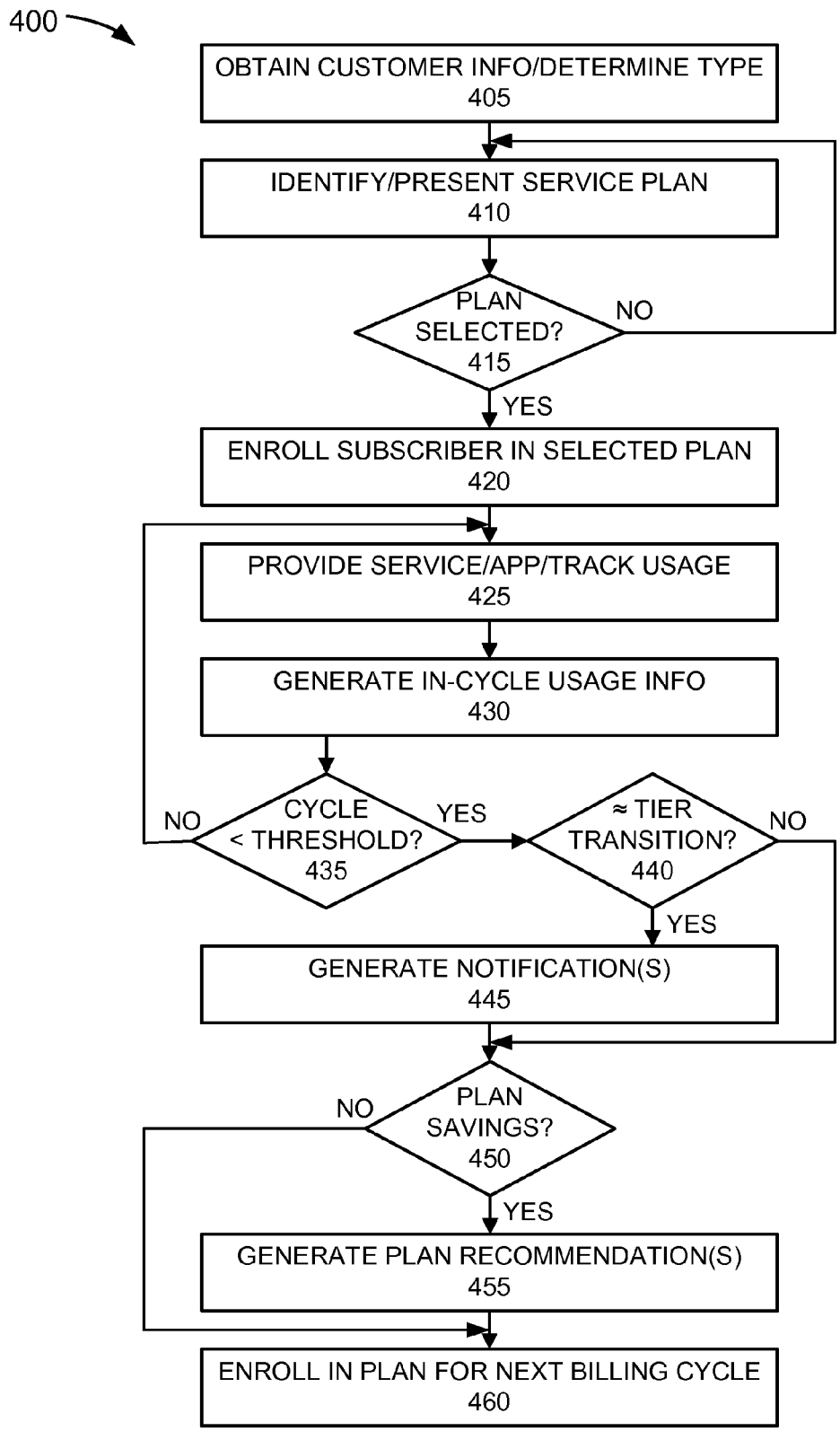
FIG. 4 is a flow diagram illustrating an exemplary process in which communication service may be provided to a subscriber.

FIG. 4 is a flow diagram illustrating an exemplary process 400 that network device 110 may implement, for example, related to operations of a service provider. Process 400 may be implemented using a network that includes, among other devices, interfaces used to communicate via any number of communication standards and in relation to network devices of the network. The network may also use any type of messaging to communicate data and/or information, as previously described.

Referring to FIG. 4, process 400 may include the service provider (e.g., network device 110) obtaining customer information for a customer associated with a subscriber device(s) (block 405). For example, network device 110 may obtain customer information from a database associated with network 105 and/or from the customer based on responses provided to requests generated by network device 110. Customer information may include, for example, registration information such as customer age, identification of the customer as an individual/business, etc., and/or historical usage information associated with a current subscriber.

Process 400 may include the service provider (e.g., network device 110) using the obtained customer information to determine a particular customer type for the customer (block 305). For example, network device 110 may categorize customers in a number of different customer types based on select parameters corresponding to the customer information/profile. In one embodiment, a customer may be determined to correspond to more than one customer type. In other embodiments, network device 110 may quantify the customer's correspondence to each of several customer types (e.g., Customer X: Customer Type A (xx %), Customer Type B (xy %), Customer Type C (yy %)).

Process 400 may include the service provider (e.g., network device 110) using the customer type(s) to identify a set of service plan options from a number of multi-tier, usage-based pricing service plans, based on the fixed plan fees and the predetermined pricing tiers set for each service plan (block 410). In some embodiments, the identified service plans may be classified based on the determined customer type(s). Process 400 may include network device 110 presenting the subscriber with the identified service plan options for selection (block 410), for example, via user device 115. For example, a customer determined to be a Customer Type A may be initially presented with Plans A and B from Table 1, a customer determined to be a Customer Type B may be initially presented with Plans B and C from Table 1, and a customer determined to be a Customer Type C may be initially presented with Plans C and D from Table 1, and so forth.

Process 400 may include the service provider (e.g., network device 110) determining whether the subscriber selects a presented service plan (block 415). If network device 110 determines that the subscriber does not select a presented service plan(s) (block 415—NO), then process 400 may return to block 410. For example, network device 110 may identify other service plan options corresponding to the determined customer type, and present the other service plan options to the subscriber. The other service plan options may be determined to have less correspondence to the customer type than the initially-identified service plan option. Blocks 410 and 415 may be repeated until a selection is made by the subscriber or until no more service plan options are identified (available to the customer for selection).

If it is determined that the customer has selected a service plan (block 415—YES), process 400 may include the service provider (e.g., network device 110) enrolling the subscriber in the selected service plan for a billing cycle (block 420). Based on the enrollment, the subscriber may access the service and/or application via the subscriber device via a network, as described above. Process 400 may include providing the service and/or the application for the billing cycle (block 425). For example, as previously described, network device 110 may provide the requested application and/or service via a subscriber device(s), such as user device 115.

Process 400 may include the service provider (e.g., network device 110) tracking cumulative in-cycle usage (block 425). For example, as previously described, network device 110 may operate applications and/or services for tracking cumulative usage. Network device 110 may select the operative tracking policies based on the type of application or service. For example, the tracking policies may determine, among other things, whether the tracking is in terms of duration (e.g., cell minutes), bytes, etc.

Process 400 may include the service provider (e.g., network device 110) generating cumulative usage information based on tracked cumulative usage (block 430). For example, as previously described, network device 110 may track the cumulative usage of the application and/or the service. The cumulative usage tracking may be based on the type of service or the type of application. For example, cumulative usage tracking of text messaging may include a transaction-based tracking corresponding to a mapping between the APN and the messaging service provided. Alternatively, cumulative usage of cell phone minutes may be tracked. The tracked usage data and/or information may be processed and cumulative usage information may be generated.

Process 400 may include the service provider (e.g., network device 110) determining whether the remaining portion of the current billing cycle is less than a threshold amount (block 435). For example, network device 110 may determine that less than a particular number of days (e.g., 1, 2, 3, 4, 5, 6, 7, 8, 9, 10, etc.) are remaining in the current billing cycle. If network device 110 determines that an amount of the current billing cycle that remains is not less than the threshold (block 435—NO), then process 300 may return to block 425. For example, network device 110 may continue to track usage during the current billing cycle.

If it is determined that less than a particular portion of the current billing cycle remains (block 435—YES), process 400 may include the service provider (e.g., network device 110) determining whether the tracked cumulative usage is approaching a transition from one usage/pricing tier to another usage/pricing tier (block 440), corresponding to an associated higher usage fee. For example, network device 110 may determine that the tracked sell phone cumulative usage is within an incremental number of minutes (e.g., 100, 90, 80, 70, 60, 50, 45, 40, 35, 30, 25, 20, 15, 10, etc.) of the next usage/pricing tier. If it is determined that a tier transition is approaching (block 440—YES), process 400 may include the service provider (e.g., network device 110) generating a notification(s) at a predetermined point in a billing cycle (block 445), for example, indicating that an approaching transition from one usage/pricing tier to another usage/pricing tier, within the service plan, is about to occur.

For example, network device 110 may determine that with 5 days remaining in the billing cycle under Plan A, the subscriber has used 450 minutes, and that transition to the next usage/pricing tier will occur upon the usage of 50 more minutes, and therefore the subscriber will incur an additional $10 fee, corresponding to the 400+ minutes tier, for the current billing cycle. Based on the determined remaining period of the billing cycle, the approaching transition to another usage/pricing tier, and/or the incremental fee associated with the transition, network device 110 may send the notification to the subscriber.

Figure 5A:
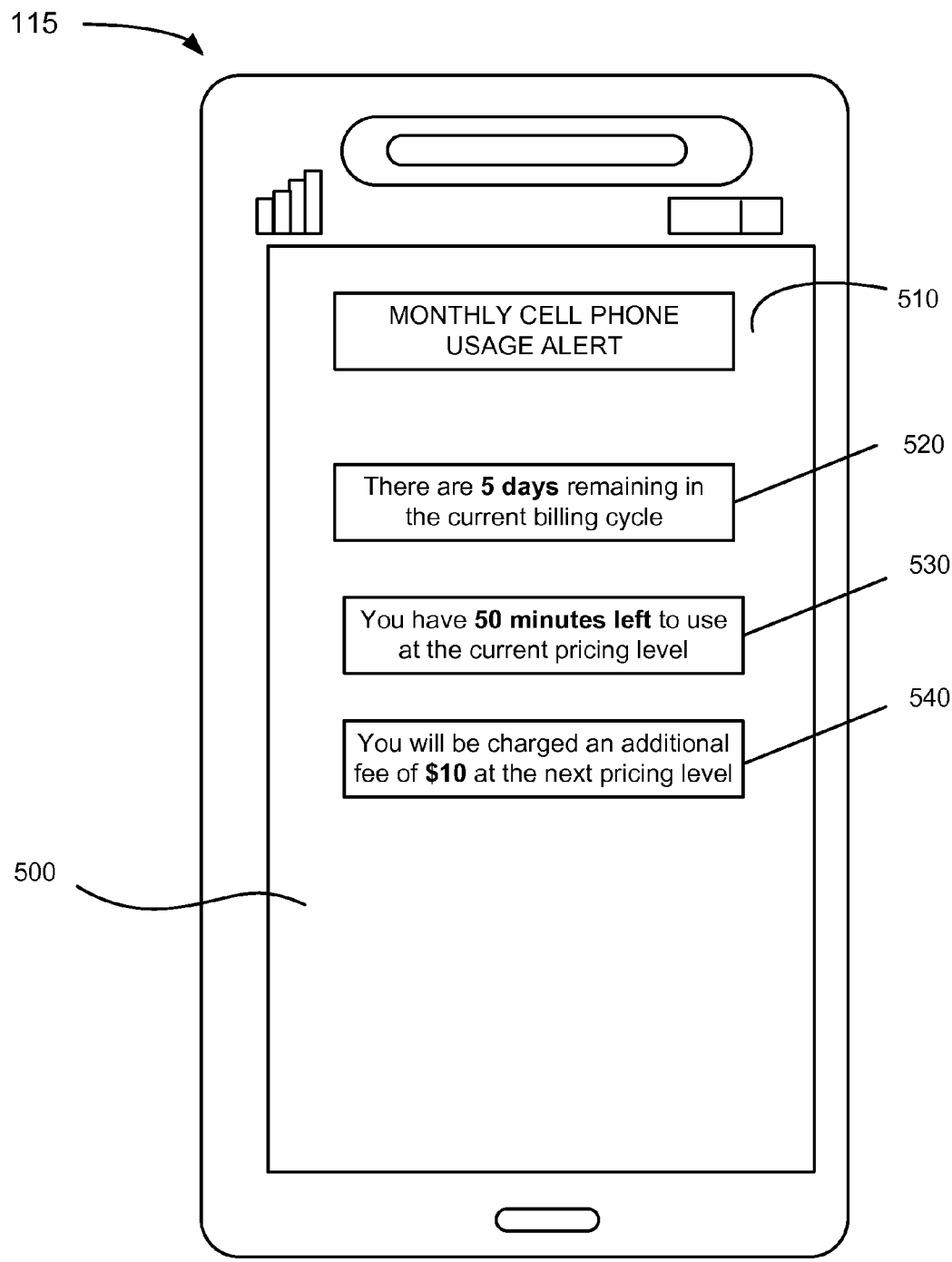
FIGS. 5A and 5B illustrate information displayed by the user device of FIG. 1 in accordance with exemplary implementations.

FIG. 5A illustrates an exemplary notification 510 that may be sent to the subscriber via a display 500 of subscriber device 115. Notification 510 may include information including a first message 520 indicating the amount of time remaining in the current billing cycle, a second message 530 indicating the number of minutes left in the current pricing tier, and a third message 540 indicating the usage fee the subscriber may incur for the current billing cycle based on a transition to the next usage/pricing tier. In one embodiment, some of the information in the messages may be presented with highlighting (e.g., bolded), such as "5 days," "50 minutes left," and "$10" as shown in FIG. 5A. Other information may be presented. For example, additional information may be presented based on user input received in response to notification 510. Based on the information provided in notification 510, the subscriber may conserve minutes, for example, so as to prevent a transition into another usage/pricing tier under the current service plan. In one embodiment, multiple notifications may be sent in one billing cycle as multiple usage/pricing tiers are approached.

If it is determined that a usage/pricing tier is not approaching (block 440—NO), then no notification may be generated/sent.

Process 400 may include the service provider (e.g., network device 110) using tracked usage and/or billing information to determine whether the subscriber may benefit from changing to another one of the multi-tiered, usage-based pricing service plans (block 450). For example, network device 110 may use post-cycle usage and/or billing information for the current billing cycle and/or a particular number of previous billing cycles related to the subscriber, to determine whether the subscriber may potentially save on service fees under other service plans.

If it is determined that it may be advantageous for the subscriber to switch from the current service plan (block 450—YES), process 400 may include the service provider (e.g., network device 110) generating a recommendation(s) to include, for example, cumulative usage information, recommendation(s) pertaining to available service plans, service control options, etc. For example, network device 110 may send the subscriber a recommendation(s) pertaining to an upgrade in service, a downgrade in service, designations to a particular plan, etc. The recommendation(s) may be sent to the subscriber, for example, as previously described, via user device 115 using one or multiple forms of communication, such as SMS, MMS, or voice communications.

Figure 5B:
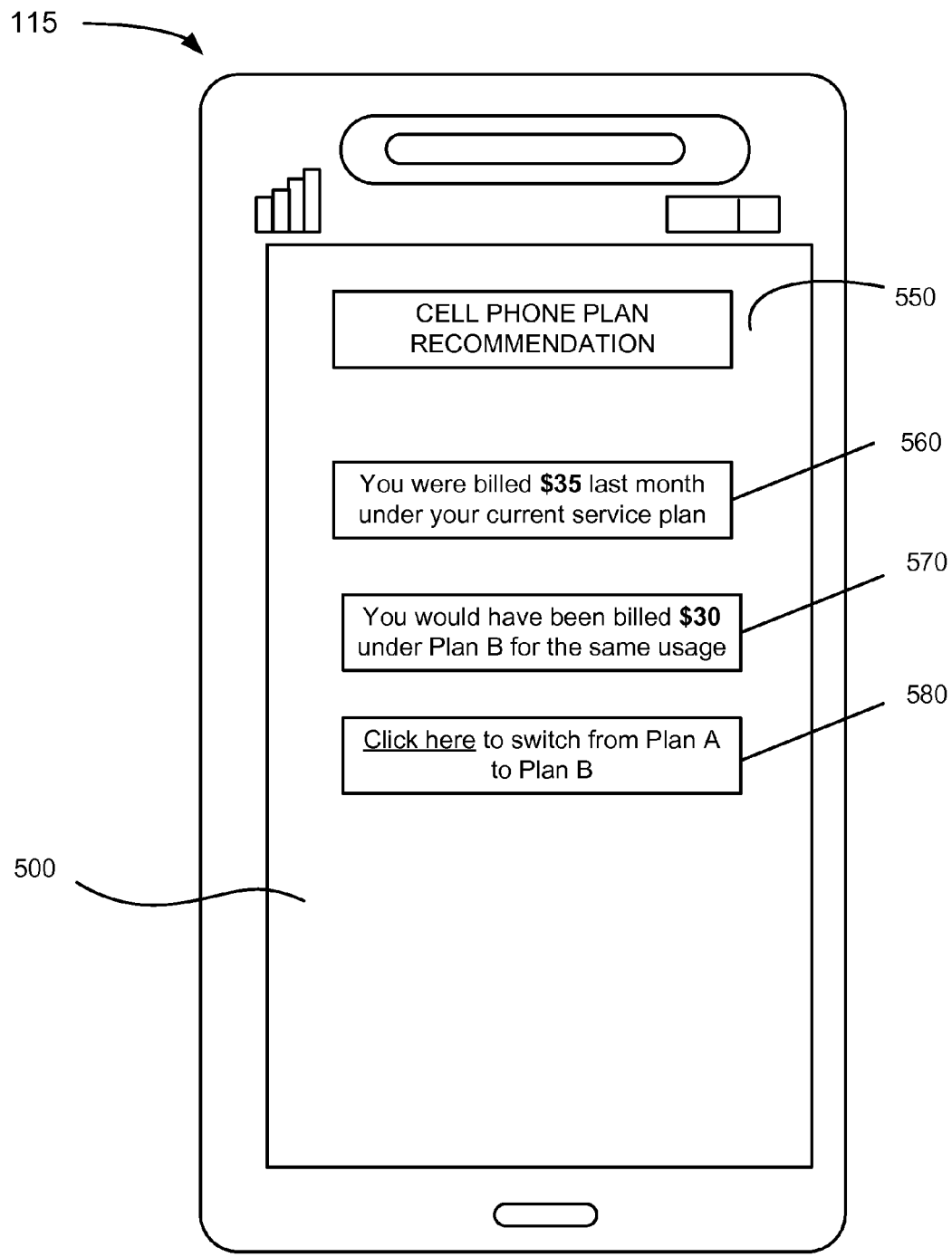

FIG. 5B illustrates an exemplary recommendation 550 that may be sent to the subscriber via display 500 of subscriber device 115. Recommendation 550 may include information including a first message 560 indicating the fees billed under the current plan (e.g., Plan A) for the last billing cycle, a second message 560 indicating the fees that would have been billed under another service plan (e.g., Plan B) for the last billing cycle, and a third message 580 which may be activated by the subscriber to switch plans. In one embodiment, some of the information in the messages may be presented with highlighting (e.g., bolded), such as "$35," "$30," and "Click here" as shown in FIG. 5A. Other information may be presented. For example, multiple plan comparisons may be provided. In one embodiment, information may be presented that indicates a pattern of usage with respect to multiple previous billing cycles.

If it is determined that the subscriber may not benefit by switching service plans (block 450—NO), then no recommendation may be generated/sent.

Process 400 may include the service provider (e.g., network device 110) enrolling the subscriber in a multi-tiered, usage-based service plan based on the subscriber's selection that is received in response to the recommendation(s) (block 460). On the other hand, network device 110 may enroll the subscriber in the same service plan, when the subscriber does not select another service plan. Further, network device 110 may enroll the subscriber in another service plan in response to a selection made by the subscriber in the absence of a recommendation.

As described above, predetermined usage/pricing tiers may be automatically applied to varying levels of service usage within a single service plan. In other words, a subscriber need not take any direct action with respect to switching, during the billing cycle, between different pricing tiers set by the applicable service plan. Instead, transition between predetermined usage/pricing levels automatically occurs based on tracked cumulative usage within the applicable billing cycle.

Although FIG. 4 illustrates an exemplary process 400, according to other embodiments, process 400 may include additional operations, fewer operations, and/or different operations than those illustrated in FIG. 4 and described.

The foregoing description of implementations provides illustration, but is not intended to be exhaustive or to limit the implementations to the precise form disclosed. Accordingly, modifications to the implementations described herein may be possible.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

The term "cumulative usage information," as used herein, is intended to be broadly interpreted to include, for example, information pertaining to usage of an application or a service. For example, cumulative usage information may include information pertaining to duration, data amount, number of messages or transactions, monetary balance, or other usage metrics related to the service or the application.

In addition, while a series of blocks have been described with regard to the process illustrated in FIG. 4, the order of the blocks may be modified in other implementations. Further, non-dependent blocks may be performed in parallel. Additionally, with respect to other processes described in this description, the order of operations may be different according to other implementations, and/or operations may be performed in parallel.

The embodiments described herein may be implemented in many different forms of software or firmware executed by hardware. For example, a process or a function may be implemented as "logic" or as a "component." The logic or the component may include, for example, hardware (e.g., processing system 305, etc.), a combination of hardware and software (e.g., applications 315), a combination of hardware and firmware, or a combination of hardware, software, and firmware. The implementation of software or firmware has been described without reference to the specific software code since software can be designed to implement the embodiments based on the description herein. Additionally, a non-transitory computer-readable medium may store instructions, which when executed, may perform processes and/or functions pertaining to the exemplary embodiments described herein.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded as illustrative rather than restrictive.

No element, act, operation, or instruction described in the present application should be construed as critical or essential to the embodiments described herein unless explicitly described as such.

What is claimed is:

1. A method comprising:
enrolling a subscriber in a multi-tiered pricing plan, selected from a set of a plurality of multi-tiered pricing plans, for telecommunication services associated with a subscriber device;
billing to the subscriber, for a first billing cycle, a fixed plan fee associated with the selected multi-tiered pricing plan, wherein the fixed plan fee differs from other fixed plan fees associated with other ones of the plurality of multi-tiered pricing plans, wherein the fixed plan fees and corresponding usage fees, associated with the multi-tiered pricing plans, have an inverse monetary relationship;
tracking, for the first billing cycle, first cumulative usage of the telecommunication service;
determining, based on the first cumulative usage, a first corresponding tier of the selected multi-tiered pricing plan;
billing, based on the first corresponding tier, a first usage fee for the first billing cycle;
billing to the subscriber, for a second billing cycle, the fixed plan fee associated with the selected multi-tiered pricing plan;
tracking, for the second billing cycle, second cumulative usage of the telecommunication service;
determining, based on the second cumulative usage, a second corresponding tier of the selected multi-tiered pricing plan; and
billing, based on the second corresponding tier, a second usage fee for the second billing cycle, wherein first usage fee differs from the second usage fee.

2. The method of claim 1, further comprising:
automatically selecting, based on information of historical cumulative usage of the telecommunication service associated with the subscriber, the selected multi-tiered pricing plan.

3. The method of claim 1, further comprising:
presenting, based on information of historical cumulative usage of the telecommunication service associated with the subscriber, recommendations to the subscriber related to selection among the plurality of multi-tiered pricing plans; and
receiving, from the subscriber, the selection of the selected multi-tiered pricing plan.

4. The method of claim 1, wherein at least one of the fixed plan fee or one of the other fixed plan fees is zero.

5. The method of claim 1, further comprising:
providing respective fixed plan fees, associated with the plurality of multi-tiered pricing plans, which correspond to varying tiers of cumulative usage of the telecommunication services.

6. The method of claim 1, wherein the first corresponding tier and the second corresponding tier comprise non-uniform ranges of cumulative usage of the telecommunication service.

7. A non-transitory computer-readable medium comprising instructions executable by at least one processor, the instructions to cause the at least one processor to:
bill a subscriber, enrolled in a multi-tiered pricing plan selected from a plurality of multi-tiered pricing plans, a plan fee associated with the multi-tiered pricing plan, for each billing cycle of a plurality of billing cycles, for services associated with a subscriber device, wherein plan fees and corresponding usage fees, associated with the multi-tiered pricing plans, have an inverse monetary relationship;
track, for each billing cycle, an amount of usage of the services;
determine, for each billing cycle, a pricing tier corresponding to the tracked amount of usage; and
bill the subscriber, for each billing cycle, a fee associated with the corresponding pricing tier, wherein at least two of the corresponding pricing tiers differ.

8. The non-transitory computer-readable medium of claim 7, wherein the plan fee is zero.

9. The non-transitory computer-readable medium of claim 7, wherein the at least two of the pricing tiers correspond to non-uniform ranges of usage of the services.

10. The non-transitory computer-readable medium of claim 7, wherein the instructions are further to cause the at least one processor to:
determine, at a point in one billing cycle, that the tracked amount of usage corresponds to a first one of the at least two of the corresponding pricing tiers;
determine, at an end of the one billing cycle, that the tracked amount of usage corresponds to a second one of the at least two of the corresponding pricing tiers; and
bill the subscriber, at the end of the one billing cycle, the fee associated with the second one of the at least two of the corresponding pricing tiers.

11. The non-transitory computer-readable medium of claim 7, wherein the instructions are further to cause the at least one processor to:
notify the subscriber of a transition, within one billing cycle, from a first amount of tracked usage corresponding to a first one of the at least two of the corresponding pricing tiers, to a second amount of tracked usage corresponding to a second one of the at least two of the corresponding pricing tiers.

12. The non-transitory computer-readable medium of claim 7, wherein the services comprise at least two of voice communication services, short message service (SMS) communication services, or multimedia messaging service (MMS) communication services.

13. A network device comprising:
a memory to store instructions; and
a processor configured to execute the instructions to:
bill a subscriber, enrolled in a multi-tiered pricing plan for services associated with a subscriber device and selected from a plurality of plan fees, a single plan fee associated with the multi-tiered pricing plan, for each billing cycle of a plurality of billing cycles;
track, for the plurality of billing cycles, different amounts of usage of the services;
determine, for the plurality of billing cycles, different pricing tiers corresponding to the different amounts of tracked usage; and
bill the subscriber, for the plurality of billing cycles, different usage fees associated with the different pricing tiers, wherein the plan fees and corresponding usage fees, associated with the multi-tiered pricing plans, have an inverse monetary relationship.

14. The network device of claim 13, wherein the processor is further configured to execute the instructions to:
determine, post billing cycle, that total fees associated with a current multi-tiered pricing plan exceed total fees associated with at least one other multi-tiered pricing plan; and
generating a recommendation, to the subscriber, to switch to the at least one other multi-tiered pricing plan.

15. The network device of claim 13, wherein the different pricing tiers correspond to non-uniform ranges of usage of the services.

16. The network device of claim 13, wherein the processor is further configured to execute the instructions to:
determine, at a point in one of the plurality of billing cycles, that the tracked usage corresponds to a first one of the different pricing tiers;
determine, at an end of the one billing cycle, that the tracked usage corresponds to a second one of the different pricing tiers; and
bill the subscriber, at the end of the one billing cycle, the usage fee associated with the second one of the different pricing tiers.

17. The network device of claim 13, wherein the processor is further configured to execute the instructions to:
generate a notification to the subscriber of a transition, within one of the plurality of billing cycles, from a first tracked usage corresponding to a first one of the different pricing tiers, to a second tracked usage corresponding to a second one of the different pricing tiers.

18. The network device of claim 13, wherein the communication services comprise at least two of a voice communication service, a short message service (SMS) communication service, or a multimedia messaging service (MMS) communication service.

* * * * *